US008132943B2

(12) United States Patent
Wang

(10) Patent No.: US 8,132,943 B2
(45) Date of Patent: Mar. 13, 2012

(54) ADJUSTABLE RECESSED LIGHTING FIXTURE

(75) Inventor: Shu-Chang Wang, Taichung (TW)

(73) Assignees: Washington-Electronics Co. Ltd. (TW); Ming-Hsuan Chen (TW)

( * ) Notice: Subject to any disclaimer, the term of this patent is extended or adjusted under 35 U.S.C. 154(b) by 0 days.

(21) Appl. No.: 12/849,813

(22) Filed: Aug. 4, 2010

(65) Prior Publication Data

US 2012/0033434 A1 Feb. 9, 2012

(51) Int. Cl.
*B60Q 3/04* (2006.01)
(52) U.S. Cl. ......... 362/362; 362/364; 362/365; 362/366
(58) Field of Classification Search .................. 362/362, 362/364, 365, 366
See application file for complete search history.

(56) References Cited

U.S. PATENT DOCUMENTS

| | | | | | |
|---|---|---|---|---|---|
| 2,597,595 | A * | 5/1952 | Ordas | 362/271 |
| 5,325,281 | A * | 6/1994 | Harwood | 362/271 |
| 5,597,233 | A * | 1/1997 | Lau | 362/294 |
| 5,630,663 | A * | 5/1997 | Ling et al. | 362/365 |
| 5,758,959 | A * | 6/1998 | Sieczkowski | 362/365 |
| 5,788,518 | A * | 8/1998 | Wachter et al. | 439/121 |
| 6,036,337 | A * | 3/2000 | Belfer | 362/287 |
| 6,471,374 | B1 * | 10/2002 | Thomas et al. | 362/285 |
| 7,434,967 | B2 * | 10/2008 | Dupre | 362/366 |
| 2002/0089851 | A1 * | 7/2002 | Jamison | 362/287 |
| 2006/0221620 | A1 * | 10/2006 | Thomas | 362/364 |
| 2009/0086476 | A1 * | 4/2009 | Tickner et al. | 362/231 |
| 2010/0061108 | A1 * | 3/2010 | Zhang et al. | 362/364 |

* cited by examiner

*Primary Examiner* — Anabel Ton
*Assistant Examiner* — Danielle Allen

(57) ABSTRACT

An adjustable recessed lighting fixture includes a housing which is adapted to be recessedly mounted in a wall. A base is fixedly mounted in the housing. The base has a substantially semi-spherical cavity defined therein. A casing is pivotally and receivably disposed in the cavity such that the casing is movable relative to the cavity along a semi-spherical shape of the cavity. At least one socket is disposed in the casing. The socket has a light emitting unit installed therein which is adapted for providing illumination. By manually and rotatably adjusting the casing relative to the base, a projecting direction of the light emitting unit is changed.

5 Claims, 6 Drawing Sheets

ADJUSTABLE RECESSED LIGHTING FIXTURE

BACKGROUND OF THE INVENTION

1. Field of the Invention

The present invention relates to lighting fixtures, and more particularly to an adjustable recessed lighting fixture which allows a user to manually and rotatably adjust a projecting direction of the lighting fixture.

2. Description of Related Art

Lighting fixture is undoubtedly a necessary apparatus for indoor space. Aside from usual lighting fixtures which are used daily for illuminating purposes, emergency lighting fixtures are also widely used nowadays for providing emergency illumination when utility power is interrupted.

A conventional emergency lighting fixture includes a lamp tube holder. The lamp tube holder has a base adapted to obtain AC power supply from an electric socket and a socket adapted to hold a tube for emitting light. A rechargeable battery and a control circuit board are mounted inside the lamp tube holder. The control circuit board drives input AC power supply to charge the rechargeable battery and converting DC battery power supply into AC power supply for the tube upon utility power interruption such that the tube illuminates for providing emergency illumination.

However, despite the effect it provides, the conventional emergency lighting fixture has the following drawbacks: first of all, the conventional emergency lighting fixture is usually mounted on a wall and the conventional emergency lighting fixture often doesn't go with the decorations of the surroundings and ruins the entire aesthetical effects of the decorations. In addition, the conventional emergency lighting fixture has a fixed projecting direction such that a user is unable to adjust the emergency lighting fixture to project in different angles for illuminating different regions. When under emergency conditions, failures to instantly adjust the projecting direction of the emergency lighting fixture to illuminate a desired region may lead to unwanted results as a user could tripped over by obstacles due to poor visibility.

The present invention has arisen to obviate/mitigate the disadvantages of the conventional lighting fixtures.

SUMMARY OF THE INVENTION

The present invention relates to an adjustable recessed lighting fixture in comprises a housing adapted to be recessedly mounted in a wall. A base is fixedly mounted in the housing. The base has a connecting portion formed thereon. The connecting portion has at least one through hole defined therein. At least one securing unit passes through the through hole of the connecting portion for firmly securing the base with the housing. The base has a substantially semi-spherical cavity defined therein. A casing includes a bowl pivotally nesting in the cavity of the base such that the bowl is pivotally movable relative to the base along a semi-spherical shape of the cavity. The bowl has a receiving space defined therein. At least one socket is disposed in the receiving space. The at least one socket has a light emitting unit installed therein adapted for providing illumination. The light emitting unit is a light emitting diode. A lid is mounted on the bowl for shielding the receiving space. The lid has at least one opening defined therein for corresponding to the at least one socket received in the receiving space such that the at least one socket is confinedly positioned in the at least one opening. A lens is assembled with the lid. The lens is adapted for protectively covering the lid and permitting illumination emitted from the light emitting unit to passing through the lens.

The housing includes a cover which is correspondingly assembled with the housing for protectively shielding the base and the rotatable casing. The cover has an accommodating hole defined therein for corresponding to the base such that the base partially protrudes from the accommodating hole.

By manually and rotatably adjusting the casing relative to the base, a projecting direction of the light emitting unit is changed.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
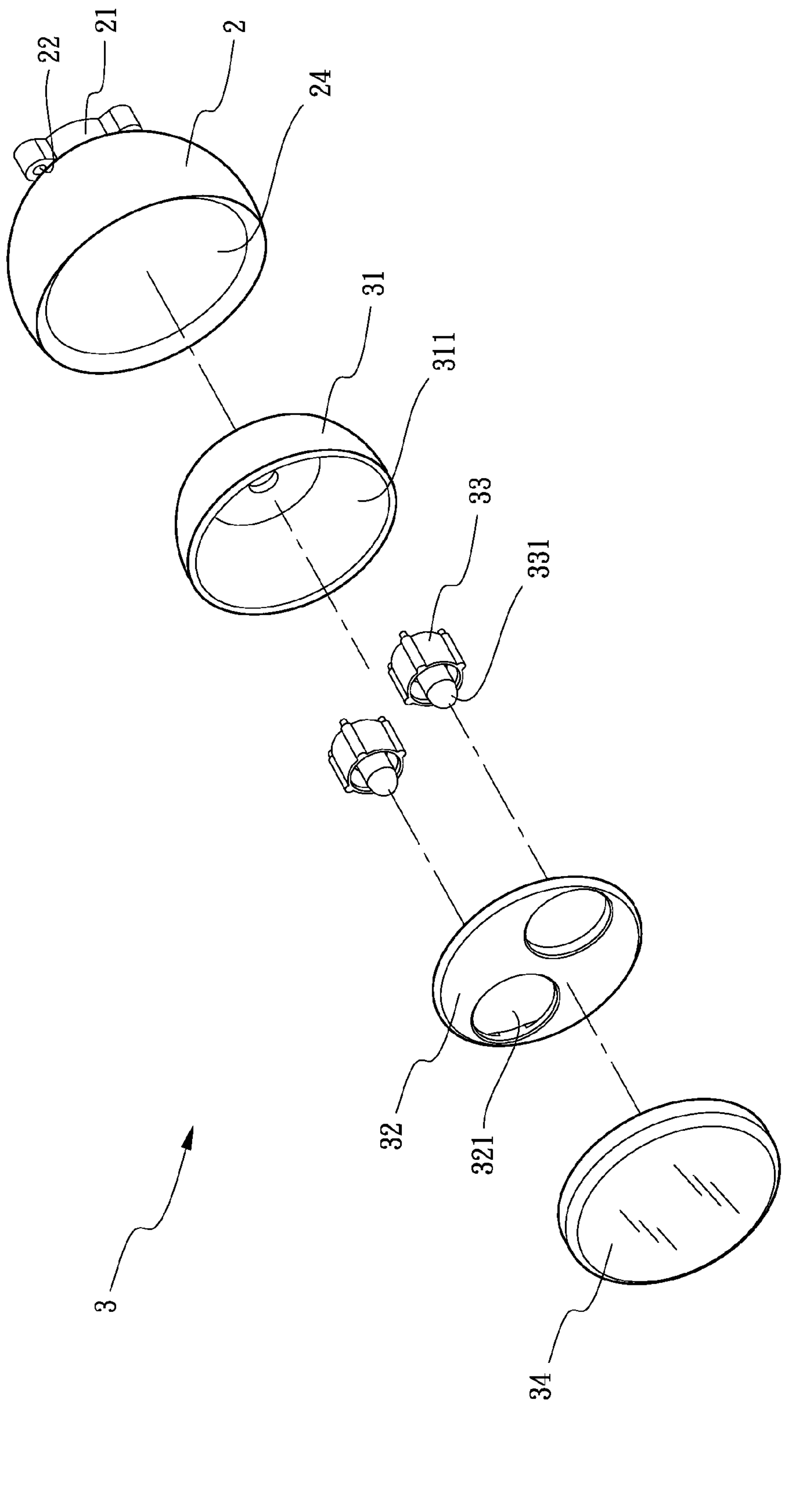
FIG. 1 is an exploded perspective view of a base and a casing of the adjustable recessed lighting fixture in accordance with the present invention.
Figure 2:
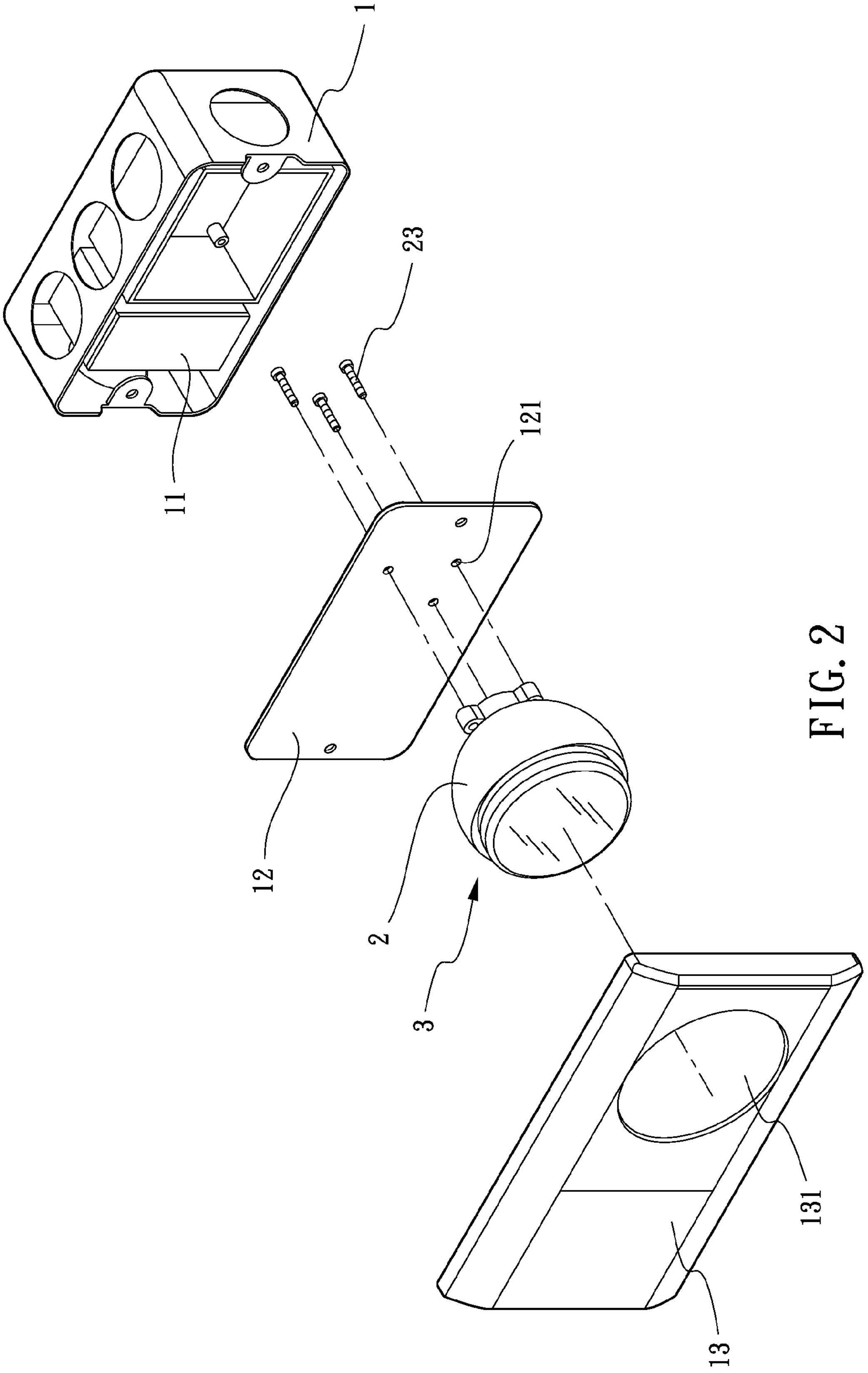
FIG. 2 is an exploded perspective view of the adjustable recessed lighting fixture in accordance with the present invention.
Figure 3:
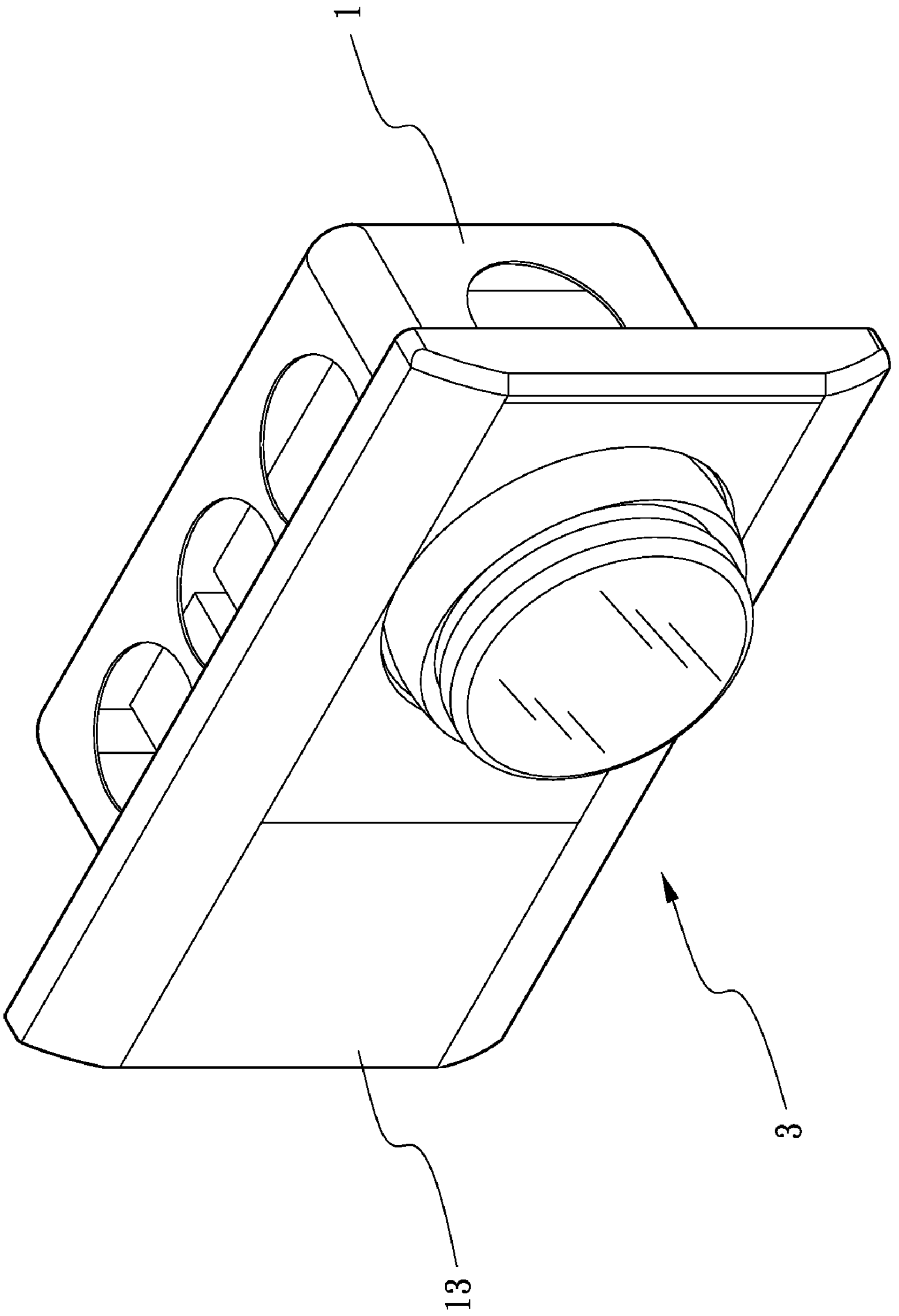
FIG. 3 is an assembled perspective view of the adjustable recessed lighting fixture in accordance with the present invention.

Referring to the drawings and initially to FIGS. 1-3, an adjustable recessed lighting fixture in accordance with the present invention comprises a housing 1 adapted to be recessedly mounted in a wall (not numbered). A battery 11 is installed in the housing 1. A circuit board 12 is securely mounted on the housing 1 and is electrically connected with the battery 11. The circuit board 12 has three through holes 121 defined therein. A base 2 is fixedly mounted in the housing 1. The base 2 has a connecting portion 21 formed thereon. The connecting portion 21 has three through holes 22 defined therein and corresponding to the three through holes 121 defined in the circuit board 12. Three securing units 23 respectively and sequentially pass through the through holes 121 in the circuit board 12 and the through holes 22 in the connecting portion 21 for firmly securing the base 2 with the circuit board 12 such that the base 2 is fixedly secured with the housing 1. The base 2 has a substantially semi-spherical cavity 24 defined therein. The cavity 24 and the connecting portion 21 are correspondingly located on two opposite sides of the base 2.

A casing 3 includes a bowl 31 pivotally nesting in the cavity 24 of the base 2 such that the bowl 31 is pivotally movable relative to the base 2 along a semi-spherical shape of the cavity 24. The bowl 31 has a receiving space 311 defined therein. The bowl 31 has a substantially semi-spherical shape corresponding to the cavity 24 of the base 2. Two sockets 33 are disposed in the receiving space 311. Each socket 33 has a light emitting unit 331 installed therein which is electrically connected with the circuit board 12 and is adapted for providing illumination. Each light emitting unit 331 is a light emitting diode (LED). A lid 32 is mounted on the bowl for shielding the receiving space 311. The lid 32 can be secured with the bowl 31 by different means, for instances: the lid 32 may be threaded into the bowl 31, or may be adhered to the bowl 31 by adhesives. The lid 32 has two openings 321 defined therein for corresponding to the two sockets 33 disposed in the receiving space 311 such that the two sockets 33 are respectively and confinedly positioned in the two openings 321. A lens 34 is assembled with the lid 32. The lens 34 is adapted for protectively covering the lid 32 and permitting illumination emitted from the light emitting unit 331 to pass through the lens 34. The lens 34 can be securely assembled to the lid 32 via different means, for instance, the lens 34 may be threaded to the lid 32, or can be adhered to the lid 32 by adhesives.

As shown in FIGS. 2-3, the housing 1 further includes a cover 13 which is correspondingly assembled with the housing 1 for protectively shielding the base 2 and the casing 3. The cover 13 has an accommodating hole 131 defined therein for corresponding to the base 2 such that the base 2 partially protrudes from the accommodating hole 131, wherein the battery 11 and the circuit board 12 are concealed by the cover 13 (FIG. 3).

Figure 4:
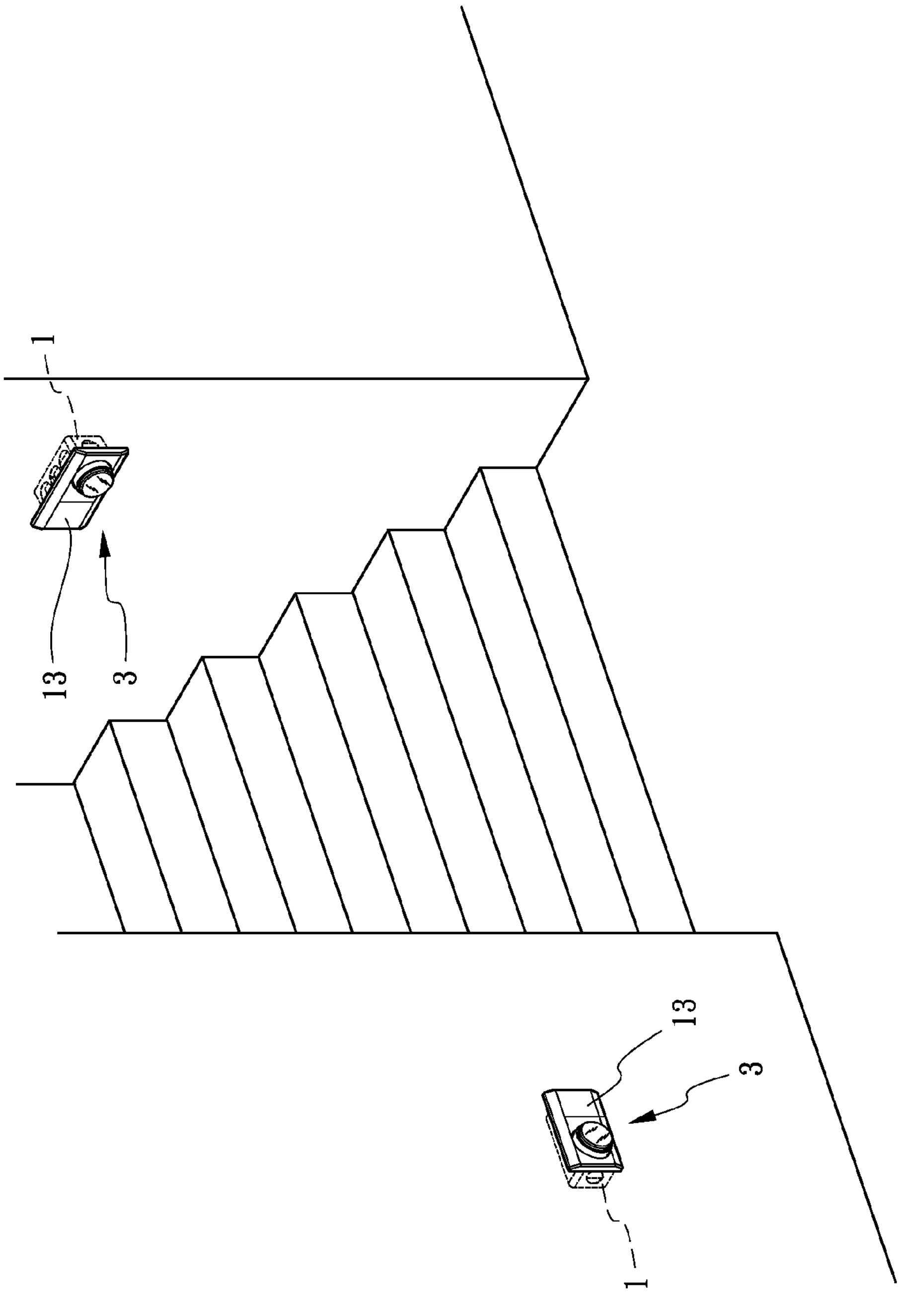
FIG. 4 is a perspective view showing the adjustable recessed lighting fixtures in accordance with the present invention mounted in walls.
Figure 6:
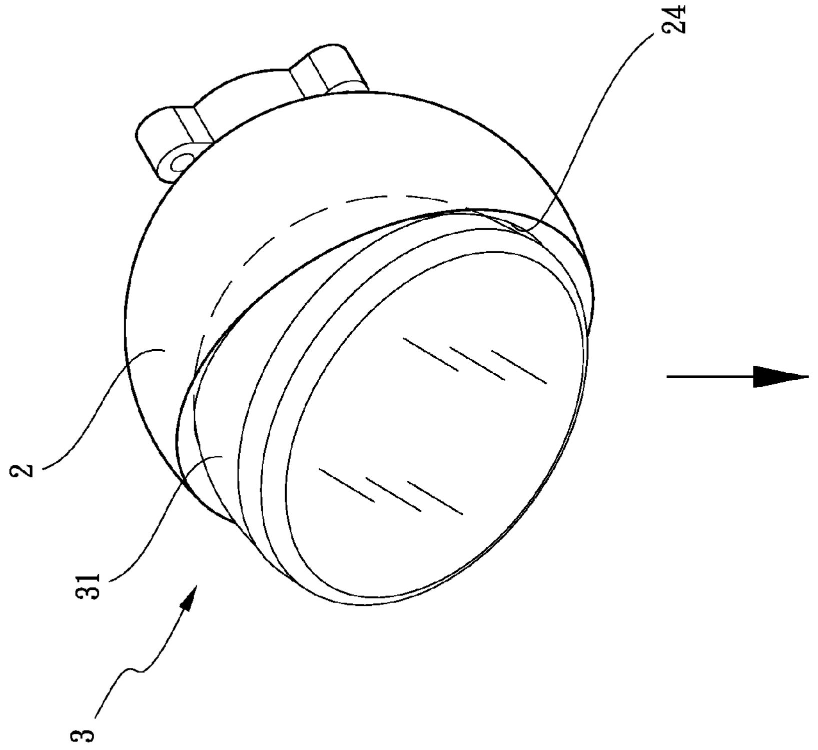
FIGS. 5-8 are operational perspective views of the base and the casing of the adjustable recessed lighting fixture in accordance with the present invention, wherein the casing is rotated relative to the base.
Figure 5:
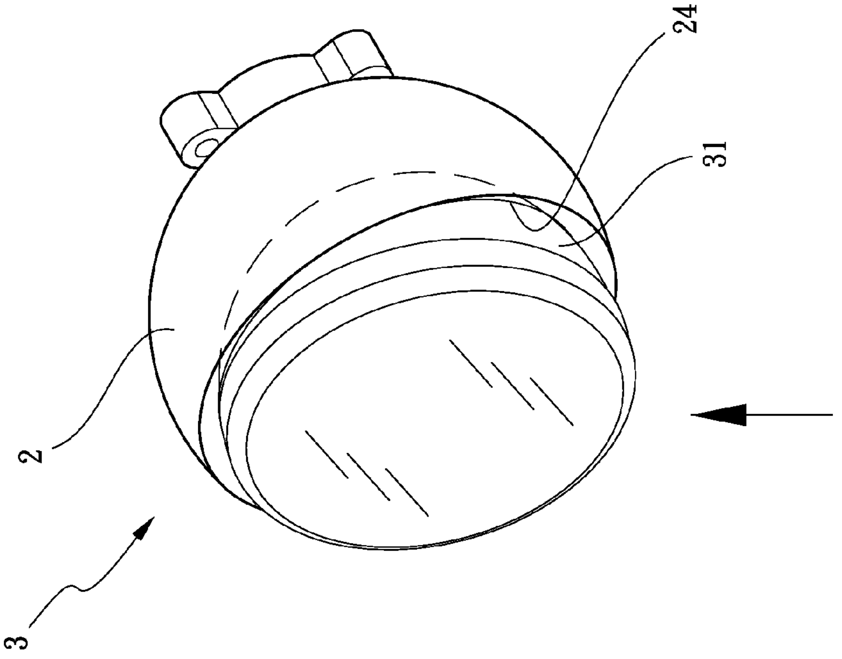
Figure 8:
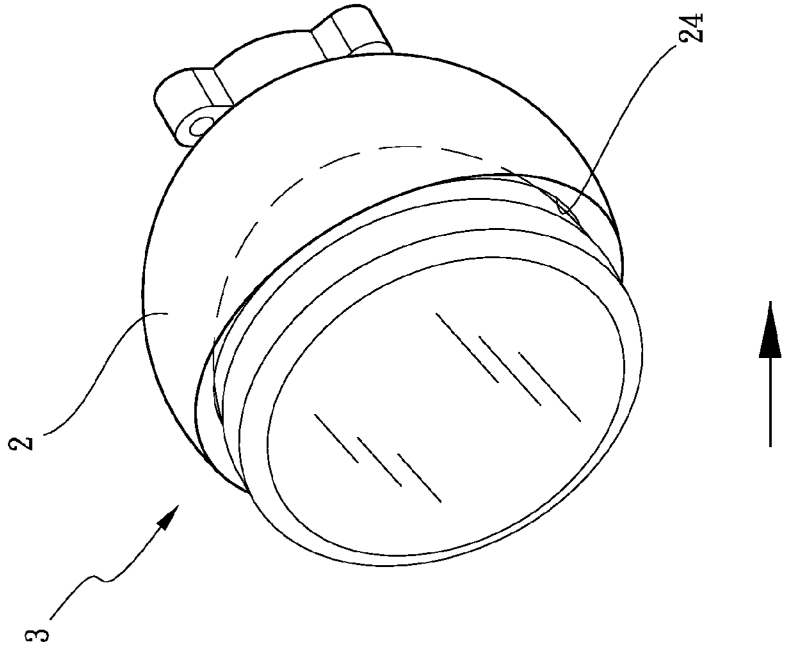
Figure 7:
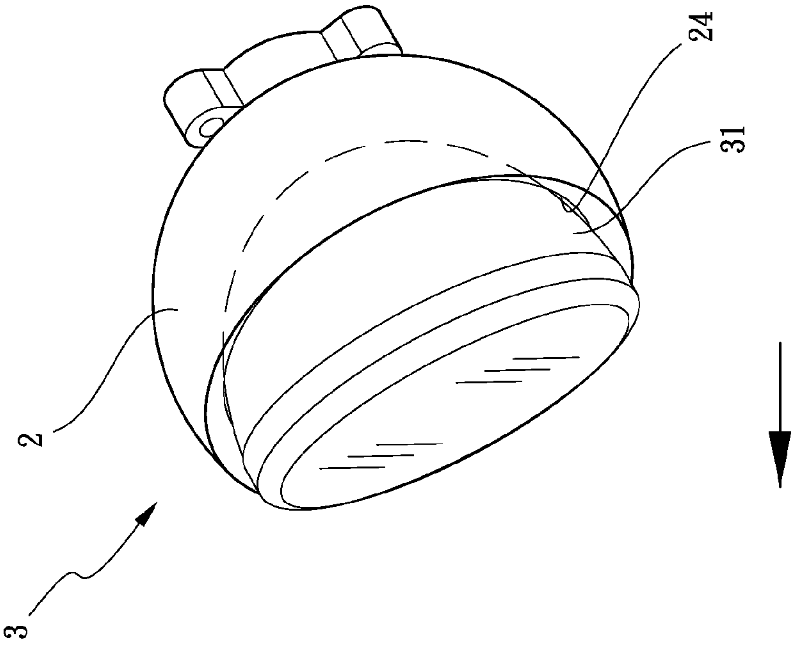

Further referring to FIGS. 4-8, operation of the adjustable recessed lighting fixture in accordance with the present invention will be described in detailed below. As shown in FIG. 4, the adjustable recessed lighting fixture is mounted on the wall, wherein the housing 1 is recessedly and concealingly mounted in the wall for providing an aesthetical effect. By manually and rotatably adjusting the casing 3 relative to the base 2 (FIGS. 5-8), a projecting direction of the light emitting unit 331 is changed, such that the user may freely adjust the projecting direction of the light emitting unit 331 at desire by conveniently rotating the casing 3. Furthermore, the circuit board 12 charges the battery 11 via input electricity, such that when utility power is interrupted, the battery 11 outputs electricity to the light emitting unit 331 via the circuit board 12 for allowing the light emitting unit 331 to continuously illuminate when utility power is interrupted. Therefore, the user is able to adjust the casing 3 to change the projecting direction of the light emitting unit 331 for illuminating a desire region.

Although the invention has been explained in relations to its preferred embodiment, it is to be understood that many other possible modifications and variations can be made without departing from the spirit and scope of the invention as hereinafter claimed.

What is claimed is:

1. An adjustable recessed lighting fixture comprising:

a housing adapted to be recessedly mounted in a wall;

a base fixedly mounted in the housing, the base having a substantially semi-spherical cavity defined therein;

a casing pivotally and receivably disposed in the cavity such that the casing is movable relative to the cavity along a semi-spherical shape of the cavity; and at least one socket disposed in the casing, the socket having a light emitting unit installed therein adapted for providing illumination;

the casing including a bowl pivotally and receivably nesting in the cavity of the base such that the bowl is movable relative to the cavity along the semi-spherical shape of the cavity, the bowl having a receiving space defined therein for accommodating the at least one socket; a lid mounted on the bowl for shielding the receiving space, the lid having at least one opening defined therein for corresponding to the at least one socket received in the receiving space such that the at least one socket is confinedly positioned in the opening;

wherein by manually and rotatably adjusting the casing relative to the base, a projecting direction of the light emitting unit is changed.

2. The adjustable recessed lighting fixture as claimed in claim 1, wherein the base has a connecting portion formed thereon, the connecting portion has at least one through hole defined therein; at least one securing unit correspondingly passing through the through hole for firmly securing the base with the housing such that the base is fixed to the housing.

3. The adjustable recessed lighting fixture as claimed in claim 1 further comprising a lens correspondingly assembled with the lid and adapted for protectively covering the lid and permitting illumination emitted from the light emitting unit to passing through the lens.

4. The adjustable recessed lighting fixture as claimed in claim 1, wherein the light emitting unit is a light emitting diode.

5. The adjustable recessed lighting fixture as claimed in claim 3, wherein the housing includes a cover correspondingly assembled with the housing; the cover having an accommodating hole defined therein for corresponding to the base such that the base partially protrudes from the accommodating hole.

* * * * *